US 6,532,980 B1

(12) United States Patent
Langeveld

(10) Patent No.: US 6,532,980 B1
(45) Date of Patent: Mar. 18, 2003

(54) PRESSURE SOURCE WITH CONSTANT RELATIVE INCREASE OF PRESSURE AND METHOD FOR DIAGNOSING SAFETY VALVES FOR OVER OR UNDER PRESSURE

(75) Inventor: Jacobus F. A. Langeveld, Ede (NL)

(73) Assignee: Kamstrap B.V., Doesburg (NL)

( * ) Notice: Subject to any disclaimer, the term of this patent is extended or adjusted under 35 U.S.C. 154(b) by 0 days.

(21) Appl. No.: 09/856,529

(22) PCT Filed: Nov. 22, 1999

(86) PCT No.: PCT/NL99/00716

§ 371 (c)(1),
(2), (4) Date: Aug. 22, 2001

(87) PCT Pub. No.: WO00/31451

PCT Pub. Date: Jun. 2, 2000

(30) Foreign Application Priority Data

Nov. 23, 1998 (NL) .............................................. 1010634

(51) Int. Cl.⁷ ............................................... F16K 37/00
(52) U.S. Cl. ..................... 137/2; 137/87.06; 137/488; 137/551; 73/37
(58) Field of Search ................. 137/2, 12, 87.01, 137/87.06, 488, 14, 551; 73/37, 40, 49.2

(56) References Cited

U.S. PATENT DOCUMENTS

| 3,741,247 A | * | 6/1973 | Kaemmer | .............. | 137/625.66 |
| 4,767,384 A | * | 8/1988 | Moan | .......................... | 474/28 |
| 5,272,647 A | | 12/1993 | Hayes | | |
| 5,367,797 A | * | 11/1994 | Zaim | .......................... | 73/49.2 |
| 5,751,606 A | | 5/1998 | Migachyov et al. | | |

FOREIGN PATENT DOCUMENTS

| DE | 4218320 A | 12/1993 |
| EP | 0508089 A | 10/1992 |
| SU | 1024769 A | 6/1983 |
| SU | 1053075 A | 11/1983 |

OTHER PUBLICATIONS

International Search Report for the corresponding International Application PCT/NL99/00716.*
International Preliminary Examination report for PCT/NL99/00716.*

* cited by examiner

Primary Examiner—Michael-Powell Buiz
Assistant Examiner—Ramesh Krishnamurthy
(74) Attorney, Agent, or Firm—Banner & Witcoff, Ltd.

(57) ABSTRACT

The invention relates to a method and apparatus for determining the switching pressure of a safety appliance, which is adapted to safeguard an installation against exceeding, or falling below, a gas pressure. An increasing pressure is applied to the safety appliance such that the applied increasing pressure rises in accordance with an exponential function. Due to the constant relative increase in the pressure supplied to the safety appliance, it is not necessary to take into account settings of the safety appliance. Errors resulting from incorrect settings by the user are thus prevented.

8 Claims, 2 Drawing Sheets

PRESSURE SOURCE WITH CONSTANT RELATIVE INCREASE OF PRESSURE AND METHOD FOR DIAGNOSING SAFETY VALVES FOR OVER OR UNDER PRESSURE

FIELD OF THE INVENTION

The present invention relates to a method for determining the switching pressure of a safety appliance which is adapted to safeguard an installation against exceeding or falling below a gas pressure, wherein an increasing pressure is applied to the safety appliance.

BACKGROUND OF THE INVENTION

Such a method is generally known. It is used to measure the switching pressure of safety appliances in order to check whether a safety appliance is functioning correctly and to check whether a safety appliance is functioning at the correct pressure.

It is of course of the greatest importance that such safety appliances respond at this correct gas pressure.

According to the prior art use is made herein of a method wherein a pressure is supplied to the safety appliance and this pressure is gradually increased until the safety appliance responds. The pressure at which this takes place is recorded, whereafter it can be compared with the nominal operating pressure and the functioning of the appliance can thus be determined.

Experience shows that the operation of such a safety appliance is usually dependent not only on the supplied pressure but also on the degree of change in the gas pressure, or in other words the derived function of the function representing the gas pressure in time. This is found to be particularly the case in situations where such safety appliances have not functioned for a long period, as will fortunately usually be the case.

This means that the safety measurements are therefore dependent upon more than one variable, so that the measurement is normally difficult to reproduce.

BRIEF DESCRIPTION OF THE INVENTION

The object of the present invention is to provide a method and an apparatus with which the above stated drawbacks of the prior art can be avoided.

This object is achieved by a method for determining the switching pressure of a safety appliance which is adapted to safeguard an installation against exceeding or falling below a gas pressure, wherein an increasing pressure is applied to the safety appliance, which method is characterized in that the supplied increasing pressure rises in accordance with an exponential function.

Owing to the constant relative increase in the pressure supplied to the safety appliance, it is no longer necessary beforehand to take into account settings of the safety appliance. Errors resulting from incorrect settings by the user are hereby prevented.

The present invention further provides a measuring device for generating a gas pressure increasing in time, which is characterized in that the measuring device is adapted to generate a gas pressure rising in accordance with an exponential function.

According to a particular preferred embodiment the supplied pressure is blown off after reaching a maximum permissible pressure which exceeds the switching pressure of the safety appliance.

It will be apparent that this measure will greatly increase the safety of the person performing the method in question.

According to another preferred embodiment the measuring device comprises a vessel with a constant volume and a supply element which is adapted to supply a gas flow to the vessel, the flow rate of which is proportional to the pressure in the vessel.

This is found to be a particularly attractive method of building up a gas pressure rising in time in accordance with an exponential function.

According to another preferred embodiment the supply element is formed by a laminar element which is arranged in a gas conduit and which is connected on one side to the vessel and connected on the other side to a pressure source, the pressure of which is always a factor higher than the pressure in the vessel.

According to yet another preferred embodiment the measuring device comprises a pressure amplifier, the inlet connection of which is connected to the vessel and the outlet connection of which is connected to the other side of the laminar element.

Other attractive preferred embodiments are specified in the remaining sub-claims.

BRIEF DESCRIPTION OF THE DRAWINGS

The present method us will be elucidated hereinbelow with reference to the annexed figures, in which.

DETAILED DESCRIPTION OF THE INVENTION

Figure 1:
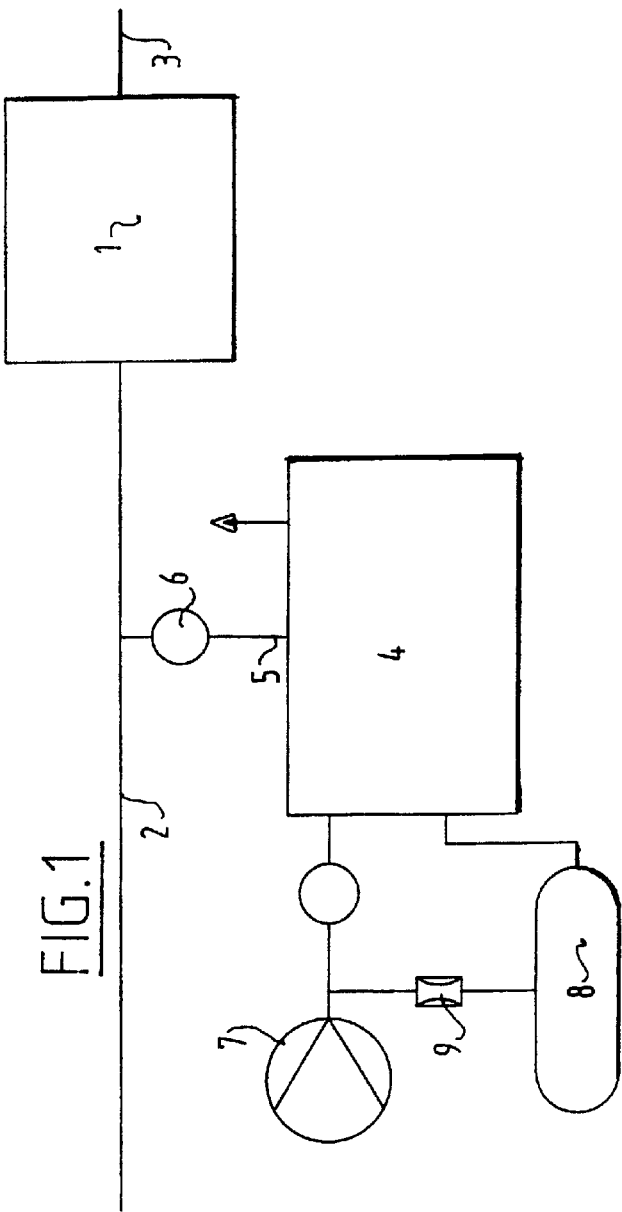
FIG. 1 shows a block diagram elucidating the method according to the present invention.

FIG. 1 shows a safety appliance 1, for instance an overpressure safety appliance connected to a gas feed conduit 2, while on the other side of safety appliance 1 is placed a part 3 of a gas mains supply for safeguarding.

In order to monitor the operation of overpressure safety appliance 1 use is made of an apparatus according to the present invention. This apparatus comprises a measuring device which is designated in its entirety as 4 and which is connected by means of a conduit 5 to the supplying gas main of safety appliance 1. For coupling between measuring instrument and gas conduit use is made of a coupling 6, which is for instance formed by a coupling which forms the subject matter of the Netherlands patent application No. 1008557. The measuring instrument 4 can be accommodated in a measuring box, wherein the measuring box cab also be provided with a compressor 7 and a pressure vessel 8, which are connected by means of a pressure-reducing valve 9. Compressor 7, pressure vessel 8 and pressure-reducing valve 9 can however also be used as separate elements or can be present in the location of safety appliance 1.

Figure 2:
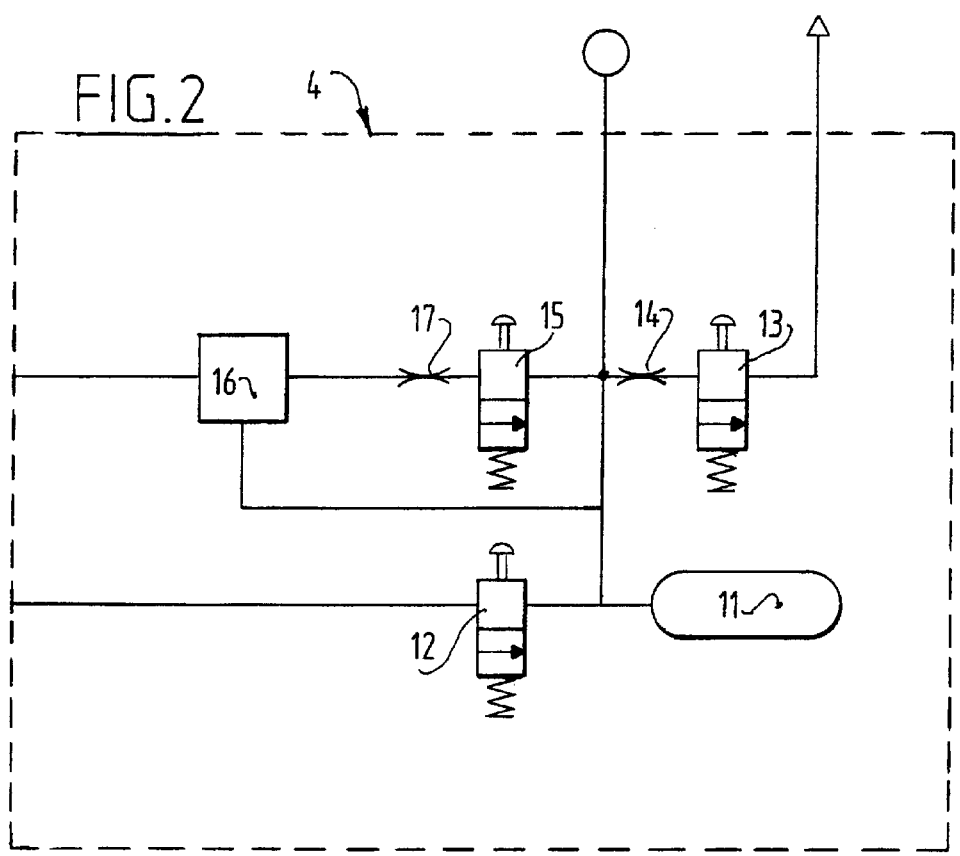
FIG. 2 shows a block diagram of the device which is used in performing the method according to the invention and which forms part of the apparatus according to the invention.
Figure 3:
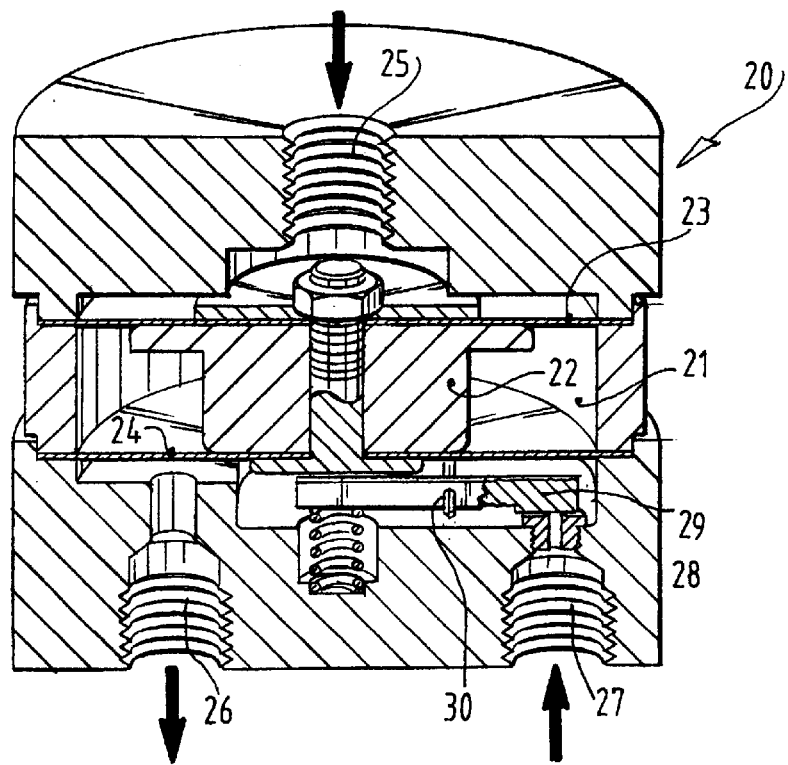
FIG. 3 shows a cross-section, partially in perspective view, of the pressure amplifier used in the present invention.

Measuring device 4, the block diagram of which is shown in FIG. 2, comprises firstly a vessel 11, a starting pressure setting valve 12, a blow-off valve 13, a restriction 14 connected in series to blow-off valve 13, a start valve 15 and a pressure amplifier 16, the construction of which will be elucidated with reference to FIG. 3.

FIG. 2 shows that the vessel is connected to the starting pressure valve, via the laminar element 14 to blow-off valve 13, to the inlet connection of pressure amplifier 16 and to start valve 15. A second laminar flow element 17 is placed between the outlet connection of pressure amplifier 16 and start valve 15. Referring to FIG. 1, the starting pressure valve 12 is connected to a pressure vessel 8 in which the starting pressure prevails, the feed side of pressure amplifier 16 is connected to a compressor 7 and vessel 11 is connected to hose 5, and therewith to the inlet connection of safety appliance 1. The outlet connection of blow-off valve 13 is connected to the ambient air.

The operation of the above stated apparatus will now be described.

Before initiating the measurement the starting pressure has to be determined at which the progression of the pressure must commence. To this end the compressor 7 is switched on and pressure-reducing valve 9 is adjusted such that the desired starting pressure prevails in pressure vessel 8. Use will of course be made herein of a manometer (not shown in the drawing). This manometer can take an electronic form, so that the measurement results become available in electronic form and can be fed for instance to a computer.

By means of operating the button 12 the starting pressure is subsequently transferred to vessel 11, wherein there follows a waiting period such that it can be assumed that the starting pressure prevails in the whole vessel 11.

The starting pressure will herein also be supplied to the inlet connection of pressure amplifier 16, so that a pressure is exerted on the outlet connection thereof, the gain of which is greater than the starting pressure. When start valve 15 is then depressed, a constant flow rate will flow to vessel 11. This constant flow rate is caused by a constant pressure difference, that is:

the gain×the pressure prevailing in vessel 11–the pressure prevailing in vessel 11 over the first laminar flow element 17

The pressure in vessel 11 will herein rise. It has been found that the system is a system of the first order, so that in the solving hereof a differential equation of the first order results, the solution to which is an exponential function, that is:

$$P(t) = P_{start} \cdot a^t.$$

The pressure increasing according to an exponential function is then supplied via coupling 6 to safety appliance 1, wherein the process is continued until the safety appliance responds. The desired value is then obtained. Due to the fact that the pressure rises according to an exponential function, secondary conditions for the response of the safety appliance are therefore constant, so that a reproducible measurement is obtained. This is elucidated with reference to FIG. 4.

When blow-off takes place on reaching the maximum permissible pressure, the laminar element provides a controlled venting, preferably to a value around the start value.

Figure 4:
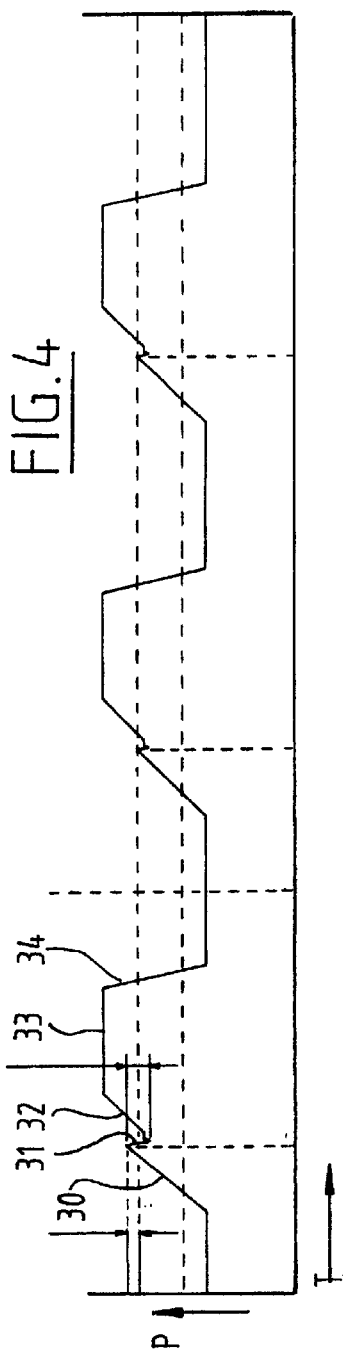
FIG. 4 shows a graph explaining the method according to the invention.

Shown in FIG. 4 is a graph of the pressure to be supplied to the safety appliance. Due to the small scale of the figure it is not possible to see how the pressure rises exponentially; the pressure is only visible as a straight line 30. When the actual response pressure of the safety appliance is reached, there occurs a pressure decrease 31 which is detected by a detection device arranged for this purpose (not shown in the drawings). This pressure decrease is caused by the response of the safety appliance. During the response a membrane shifts, whereby the volume changes. The changed, generally increased volume results in a sudden small pressure decrease. The increase in pressure is then resumed, as shown with line 32, albeit with a slightly smaller gradient caused by the slightly greater volume to which the constant gas flow is supplied. The pressure increase is of course interrupted when the maximum permissible pressure 33 of the safety appliance is reached. The pressure is then blown off at 34, whereafter a new cycle can commence.

Finally, the operation of the pressure amplifier will be elucidated with reference to FIG. 3.

The pressure amplifier is formed by a housing 20 in which is arranged a chamber 21, inside which a body 22 is displaceably mounted. Chamber 21 is connected to the ambient pressure. The movements of body 22 are determined by two membranes 23,24. Membranes 23,24 likewise serve to close off the space above membrane 23 and the space below membrane 24. The space above membrane 23 is connected to a feed channel 25 for supply of the input pressure.

The space below membrane 24 is further connected to an outlet channel 26 for relieving the output pressure. The effective surface area of body 22 connected to the space which is connected to feed channel 25 is greater than the relevant surface area connected to the space below membrane 24. This means that body 22 is in equilibrium when the pressure in the space above membrane 23 is the surface area ratio times smaller than the pressure below membrane 24. For supply of gas under pressure to the space below membrane 24 a feed channel 27 is arranged for gas under pressure which is separated by means of an automatically operated valve 28 from the space below membrane 24. Valve 28 is operated by means of a lever 29 by the body 22. For this purpose the lever is suspended rotatably on a shaft 30 accommodated in body 20.

Such a pressure amplifier results in the desired characteristic, so that it possible to generate the required pressure characteristic.

What is claimed is:

1. Device for determining a switching pressure of a safety appliance adapted to safeguard an installation against a gas pressure exceeding, or falling below, a threshold, the device comprising supply means for supplying an increasing gas pressure to the safety appliance, wherein the supply means comprise a vessel with a constant volume and a supply element adapted to supply a gas flow to the vessel, wherein the gas flow rate is proportional to the pressure in the vessel.

2. Device as claimed in claim 1 wherein the supply element comprises a laminar element arranged in a gas conduit and connected on one side to the vessel and connected on the other side to a pressure source, wherein the pressure of the pressure source is always a factor x times the pressure in the vessel.

3. Device as claimed in claim 2 further comprising a pressure amplifier having an inlet connection connected to the vessel and an outlet connection connected to the other side of the laminar element.

4. Device as claimed in claim 3 wherein the laminar element comprises a conduit having a diameter less than a hundredth part of the length of the laminar element.

5. Device as claimed in claim 4 wherein:
   the pressure amplifier comprises a chamber, wherein a movable body is placed inside the chamber dividing the chamber into two parts, an inlet conduit is connected to one of the two parts of the chamber and an outlet conduit is connected to the other part of the chamber, the ratio between the effective surface areas of the movable body which are connected to the first part and the second part are inversely proportional to the gain, and the movable body is coupled to a valve arranged in a gas supply conduit.

6. Device as claimed in claim 3 wherein:

the pressure amplifier comprises a chamber, wherein a movable body is placed inside the chamber dividing the chamber into two parts, an inlet conduit is connected to one of the two parts of the chamber and an outlet conduit is connected to the other part of the chamber, the ratio between the effective surface areas of the movable body which are connected to the first part and the second part are inversely proportional to the gain, and the movable body is coupled to a valve arranged in a gas supply conduit.

7. Device as claimed in claim 1 wherein the device comprises means for blowing off when a maximum permissible pressure exceeding the switching pressure of the safety appliance is reached.

8. Method for determining the switching pressure of the safety appliance adapted to safeguard the installation against the gas pressure exceeding, or falling below, the threshold, comprising determining the switching pressure with the device according to claim 1.

* * * * *

UNITED STATES PATENT AND TRADEMARK OFFICE
CERTIFICATE OF CORRECTION

PATENT NO.     : 6,532,980 B1                                                Page 1 of 1
DATED          : March 18, 2003
INVENTOR(S)    : Jacobus F. A. Langeveld It is certified that error appears in the above-identified patent and that said Letters Patent is hereby corrected as shown below:

<u>Title page,</u>
Item [73], Assignee, "Kamstrap" has been replaced with -- Kamstrup --.

Signed and Sealed this

Seventh Day of October, 2003

JAMES E. ROGAN
*Director of the United States Patent and Trademark Office*